(No Model.) 6 Sheets—Sheet 1.

A. E. ELLINWOOD.
CORN HARVESTER.

No. 530,222. Patented Dec. 4, 1894.

Witnesses
Geo. T. Smallwood
Isaac Behrend

Inventor
Augustus E. Ellinwood,
By his Attorneys
A. M. Smith & Son (No Model.)  
6 Sheets—Sheet 4.

A. E. ELLINWOOD.
CORN HARVESTER.

No. 530,222. Patented Dec. 4, 1894.

Witnesses  
Geo. T. Smallwood  
Isaac Behrend

Inventor  
Augustus E. Ellinwood  
By Attorneys  
A. M. Smith & Son (No Model.)  6 Sheets—Sheet 5.
A. E. ELLINWOOD.
CORN HARVESTER.
No. 530,222. Patented Dec. 4, 1894.
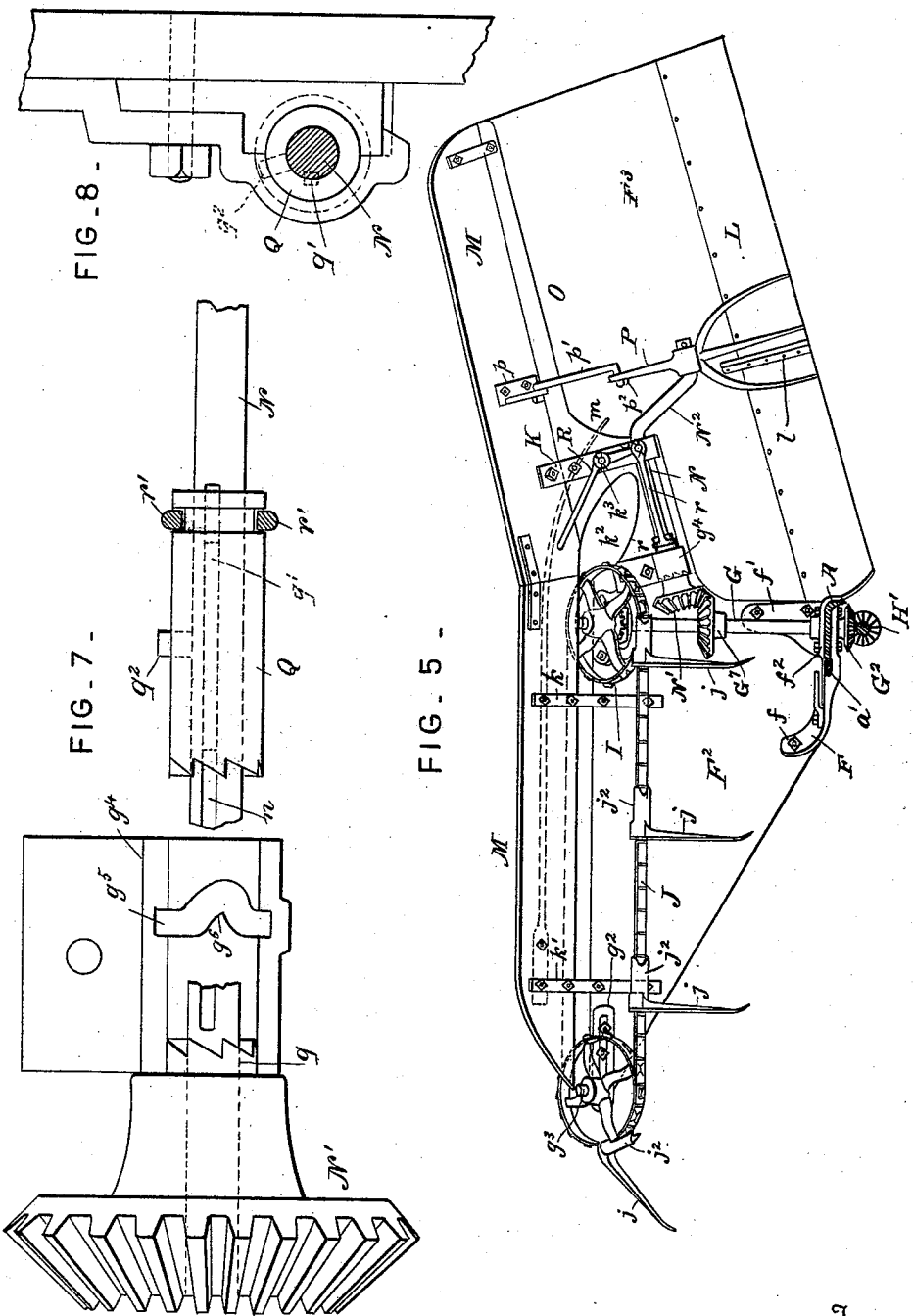
Witnesses: Geo. T. Smallwood, Isaac Behrend
Inventor: Augustus E. Ellinwood
By Attorneys A. M. Smith & Son (No Model.)  A. E. ELLINWOOD.  6 Sheets—Sheet 6.
CORN HARVESTER.
No. 530,222.  Patented Dec. 4, 1894.
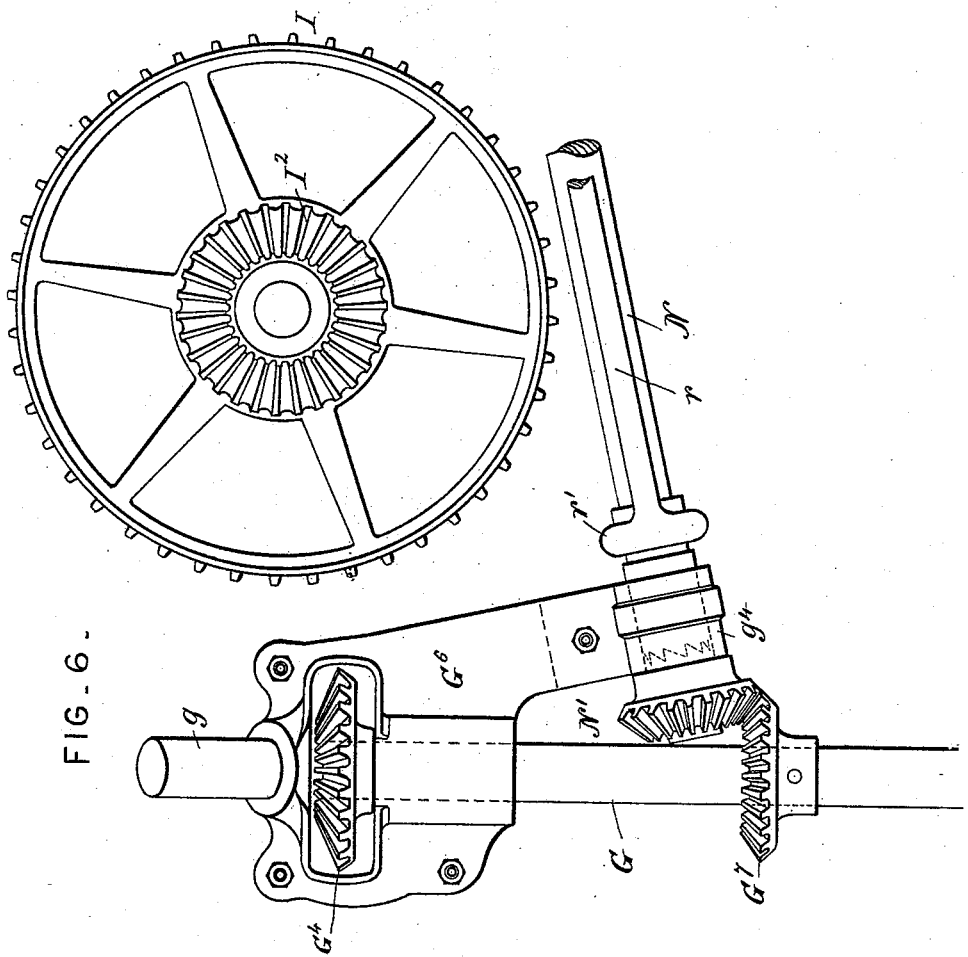
Witnesses
Geo. T. Smallwood.
Isaac Behrend.
Inventor
Augustus E. Ellinwood
By Attorneys

UNITED STATES PATENT OFFICE.

AUGUSTUS E. ELLINWOOD, OF AKRON, OHIO, ASSIGNOR TO LEWIS MILLER, OF SAME PLACE.

CORN-HARVESTER.

SPECIFICATION forming part of Letters Patent No. 530,222, dated December 4, 1894.

Application filed May 10, 1890. Serial No. 351,222. (No model.)

*To all whom it may concern:*

Be it known that I, AUGUSTUS E. ELLINWOOD, a citizen of the United States, and a resident of Akron, county of Summit, and State of Ohio, have invented a new and useful Improvement in Corn-Harvesters, of which the following is a full, clear, and exact description, reference being had to the accompanying drawings, making part of this specification.

My invention relates to an arrangement of toothed chains and their carrying and actuating sprocket wheels and to the arrangement in connection therewith of the receptacle for the corn and of the side delivery rake or fork operating in connection therewith, and to the gearing for actuating the chains and fork or rake.

Figure 1:
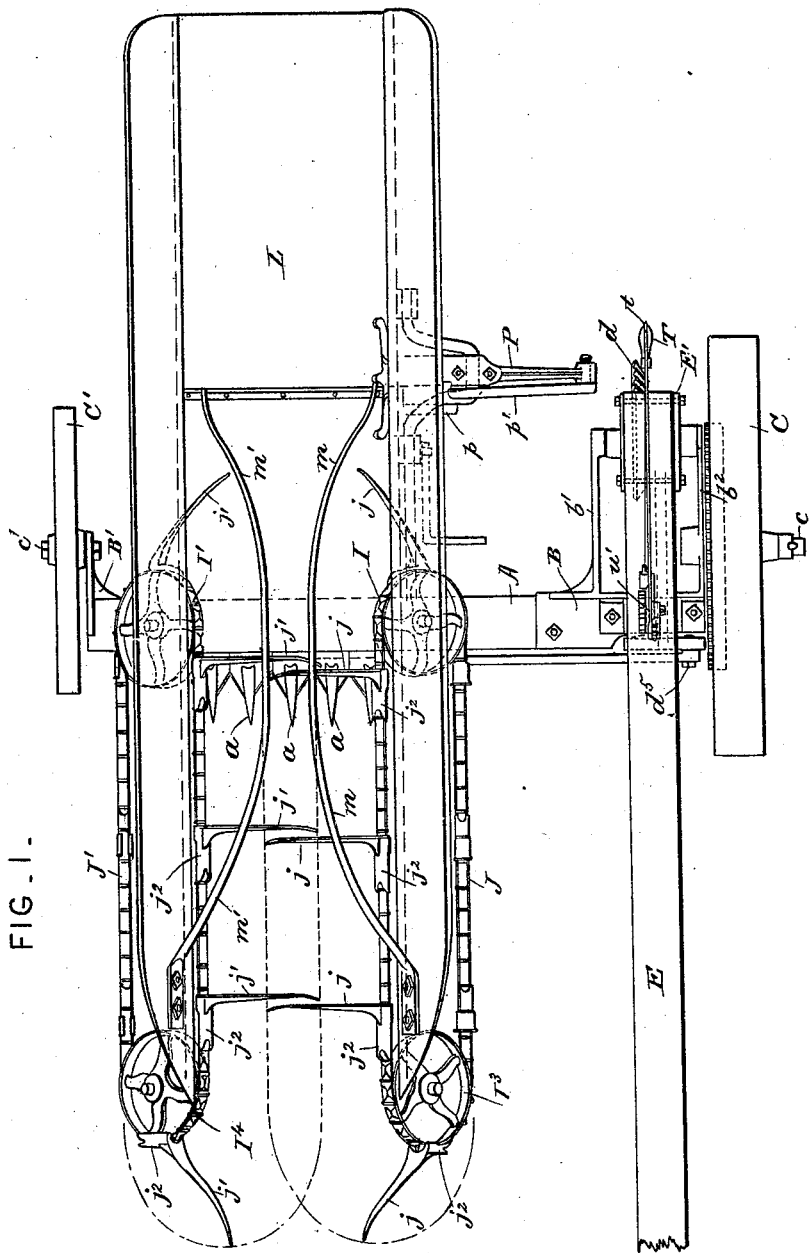
Figure 2:
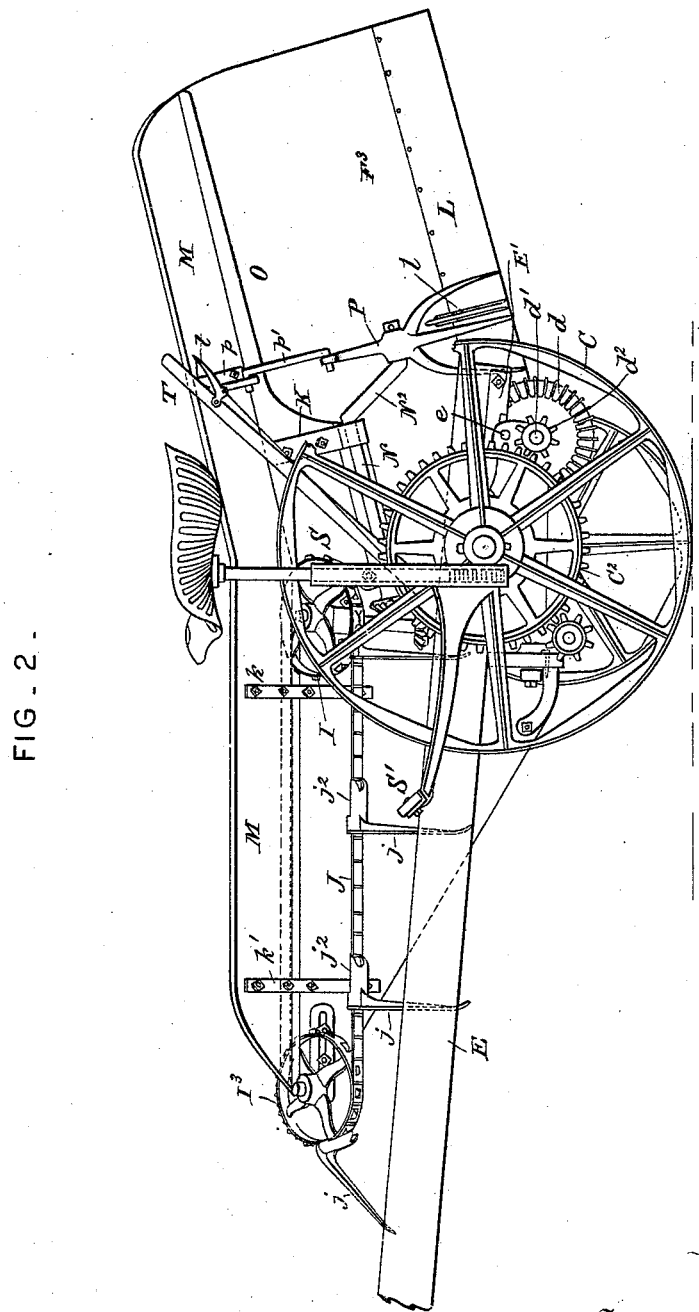
Figure 3:
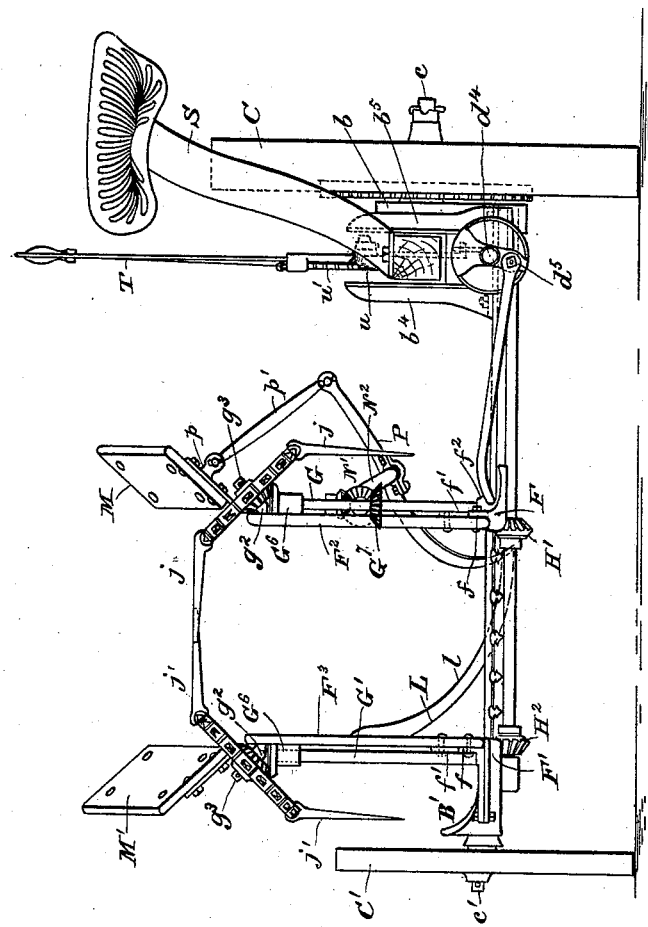

In the accompanying drawings—Figure 1, is a plan view of a machine embracing my improvements; Fig. 2, a stubble side elevation; Fig. 3, a front elevation, and Fig. 4, a rear elevation thereof. Fig. 5, is a longitudinal section, taken adjacent to the stubble side of the gathering and discharging devices and showing the latter in side elevation. Figs. 6, 7 and 8 are enlarged, detail views of some of the gearing, &c., hereinafter referred to.

A, indicates the main frame and finger bar of the machine made, preferably of a stout bar of metal of angular, or curved runner form, (reversed) in cross section, as shown in Fig. 5. To the inner end of this bar a gear plate or casting B is rigidly secured provided on its stubble side with an upright $b$ in rear of the bar A, having a stud axle $c$, on which the main drive wheel C is journaled. A plate or casting B', is secured to the outer end of the bar A and has an axle $c'$ in the same transverse line with axle $c$, and on which the grain wheel C' is journaled. The rear end of the casting B is bifurcated to admit between its arms $b'$ and $b^2$, a bevel wheel $d$, fast on a short counter shaft $d'$, and having a pinion $d^2$ fast on its inner end, in mesh with a cogged rim $C^2$ on the drive wheel for actuating it.

$d^3$ is a bevel pinion in mesh with the bevel wheel $d$ and fast on the rear end of a crank shaft $d^4$ journaled in suitable bearings on the casting B, and provided on its forward end, in front of the bar A, with a crank $d^5$, from which a pitman extends to the heel end of the knife bar $a'$, for actuating the latter. The bar A has slotted guard fingers $a$, secured to it through which the knife bar, with its knife sections, operates, in a well known manner.

The draft attachment or tongue E, is secured at its rear end in a plate E', having trunnions $e$, on its sides, entering ears $b^3$ on the arms $b'$ and $b^2$, pivoting the tongue thereto and on the forward end of the plate B are rigid uprights $b^4$, $b^5$, forming cheek plates at the sides of the pole, in front of the pivot, for steadying the connection of the pole with the gear plate and frame bar and permitting the latter to rise and fall relatively to the tongue, to adapt the machine to its work.

Figure 4:
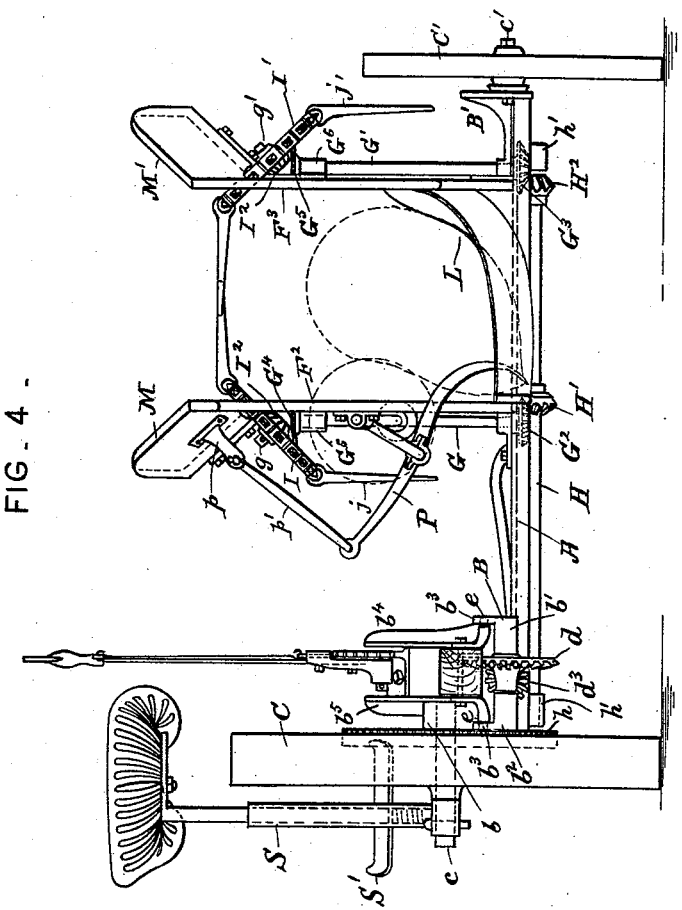

The bar A has shoes F, F', secured to it, one on each side of the cutters, the points of which shoes are made in runner form and provided, on their adjacent sides with upright flanges or lugs $f$, and, directly over the shoes, plates $f^2$ B', are secured having upright lugs or flanges $f'$, in the same longitudinal plane with the lugs $f$ and to these upright lugs $f$ and $f'$ upright divider boards F² and F³ are rigidly secured. These boards are made tapering, sloping upward on their lower edges in front of the cutters to a point. The flange $f'$ to which the outer divider board F³ is secured, is shown formed on the inner side of the plate B' instead of on a separate plate $f^2$, and these plates $f^2$ and B' are perforated to form bearings for upright shafts G and G', the lower ends of which pass through the bar A and are provided with bevel wheels G² and G³, in mesh with bevel pinions H' and H², facing in opposite directions, outward, and fast on a common shaft H, journaled in suitable pendent bearings $h'$, on the bar A and provided on its stubble end, with a pinion $h$, in gear with the cogged rim on the drive wheel. The upper ends of the shafts G and G' (see Fig. 6), are provided with bevel wheels G⁴ and G⁵ and are journaled in brackets G⁶, secured to the outer sides of the divider boards F² and F³, at their upper edges. The extreme upper ends of the brackets G⁶, have short, stud shafts $g$ and $g'$, rigid on them and set inclining in opposite directions, away from each other, and upon these stud shafts, sprockets wheels I and I' having bevel pinions I² (see Fig. 6) rigid on their lower faces, are journaled, the angle of inclination of the stud shafts $g$ and $g'$ to the shafts G and G' being such as to cause the pinions I², to engage the bevel gears G⁴ and G⁵ respectively, as shown in Fig. 4, for driving the sprocket wheels I and I' in opposite directions. The divider boards F² and F³, have slotted and adjustable brackets $g^2$, bolted to their forward ends, said brackets having upright stud shafts $g^3$ formed on their forward ends, conforming in inclination to the inclination of the shafts $g$ and $g'$, and carrying sprocket wheels I³ and I⁴, around which endless chains J, and J' pass, respectively, from the driving sprocket wheels I and I' as shown.

The shafts $g$ and $g'$ are set, preferably, at an angle of about forty-five degrees to the shafts G and G', and the teeth $j$, $j'$ on the chains J and J', which are of sufficient length to cause the ends to overlap as they move back between the divider boards, are secured to links of the chains, at regular intervals, at a corresponding angle, so that, in moving forward on the outer, lower sides of the chains, they hang pendent therefrom, in a vertical or nearly vertical position; while in moving back toward the cutting apparatus, on the inner, adjacent and higher sides of the chains they assume a horizontal position, adapting them to move over the space between the divider boards and carry the stalks back to the cutters.

The fingers by the construction and arrangement described are made to move forward in a vertical position and then to rise as they pass around the forward sprocket wheels and inward toward each other, into a horizontal position, thereby adapting them to pass their points under and pick up fallen stalks and then to move back, in a horizontal position, carrying the same and all stalks standing between the divider boards, to the cutters. The tension of the chains is adjusted by adjustment of the brackets $g^2$, and the fingers $j$ and $j'$, at their junction with the chain links have heel projections $j^2$ formed on them, which while permitting the teeth to pass readily around the sprocket wheels, prevent the fingers from being deflected by the pressure of the corn against them and so permitting the corn to escape between them.

The divider boards extend back of the cutters and have upright straps K in rear and $k$, $k'$, in front of the line of cut, the upper ends of which straps are bent outward into planes parallel with and above the shafts $g$ and $g'$, and to these ends outwardly inclined fender boards M and M' are rigidly secured sufficiently removed at their lower edges from the tops of the divider boards to accommodate the sprocket wheels between them and said divider boards, as shown, and, in rear of the sprocket wheels the opening is enlarged at $k^2$, to permit the fingers $j$ or $j'$ to pass obliquely through them. At the front, the fingers pass around the forward sprocket wheels in front of the fenders and divider boards.

The outer divider board F³, and fender M', extend, in rear of the cutting apparatus, to form the outer side of a grain receptacle and the side board has an inclined concave L rigidly connected at its higher edge, with it, said concave forming the bottom of the receptacle. The rear end of this bottom may be rounded from its outer side inward and raised or provided with a guard for preventing the stalks from sliding off said end, as shown in Fig. 4. The inner divider board and fender are also extended, in rear of the cutters, but the lower portion of said side board is cut away, or omitted at O, to permit the movements of a side delivery fork or rake and the lateral removal of the stalks at that said side.

$m$ and $m'$, are curved rods, rigidly secured at their forward ends to the fenders M and M', and bending thence inward over the chains, they serve to compress the stalks between them until they reach and pass over the cutters, when said rods are again curved outwardly, and by preference downward, as shown in Fig. 5, sufficiently in rear of the sprocket wheels I and I' to cause them to strip the stalks from the fingers $j$ and $j'$ and facilitate their deposition the receptacle.

A pendent arm of the bracket G⁶, is provided with a short sleeve bearing $g^4$, and the lower end of the strap or bracket K has a similar bearing for an inclined shaft N, having a bevel pinion N', on its forward end in mesh with a bevel gear G⁷, on the upright shaft G. The rear end of the shaft N has a crank arm N² formed on it to the wrist pin of which a fork or rake stale P is connected, at or near the center of its length. (See Figs. 3 and 5.) To the rear extension of the fender M, is secured a bracket $p$, having a perforated lug or ear to which the upper end of a link $p'$ is pivoted, the lower end of said link being pivoted to the end $p^2$, of the rake stale, for permitting said end to swing with said link as the crank N², is rotated for actuating the fork or rake. The crank rotates toward the receptacle at the highest point of its movement, and is thereby caused to lift the fork or rake over the corn in said receptacle, then allowing it to descend and engage and pull the stalks out laterally, through the opening O, depositing them at one side of the receptacle, out of the way of the team and machine on the next round, the fork moving in an elliptical path indicated by dotted lines in Fig. 4.

The fork or rake is operated to remove the stalks as often as the latter accumulate in sufficient quantity, and is controlled by the driver or attendant by devices as follows:

The bevel gear N' is mounted loosely on its shaft N, and the rear end of its hub is provided with a short clutch-faced extension or sleeve $q$, which rests within the forward end of a divided-sleeve bearing $g^4$.

Q is a clutch-sleeve having a clutch-face on its forward end matching the clutch face on sleeve $q$, extending therefrom through the sleeve bearing $g^4$, and provided on its inner face with a feather $q'$ entering a longitudinal groove $n$, in the shaft N, for rotating the shaft when the clutch sleeve is rotated, but permitting the latter to be moved endwise on the shaft and into or out of engagement with the clutch face on its actuating pinion N'. The sleeve Q has a pin $q^2$ on its periphery, which when the sleeve is rotated moves in a cam groove $g^5$, in the divided sleeve bearing and at the end of each revolution serves, by moving in contact with a cam projection at $g^6$, in said groove to move the sleeve Q out of engagement with the clutch $q$, and so to stop the movement of the fork or rake, until the sleeve is again moved into engagement with its driving pinion. For the latter purpose, a bell crank or angular lever R is pivoted at its elbow on a stud $k^3$, on the strap bracket K, and to the lower end of the upright arm of said lever a link $r$ is pivoted having a fork or collar $r'$, on its forward end engaging a groove in the rear end of the clutch sleeve Q. By lifting the horizontal arm of the lever, the sleeve Q can be thrust forward into engagement with the clutch $q$, setting the fork or rake in action, and the contents of the receptacle can thus be removed whenever it is desired.

By the arrangement of gearing described, it will be seen that the sprocket wheel I and the rake shaft N, set at different angles to the shaft G are both geared to and driven from said shaft and that the latter and shaft G' are both driven, but in opposite directions from a common shaft H.

In Figs. 2 and 4, the seat standard S, and the driver's foot rest S' connected therewith, are shown applied to the outer end of the stationary drive wheel axle, while in Fig. 3, a curved standard is shown rigidly secured to the pole and overhanging the drive wheel.

T indicates a lever pivoted on a bracket $u$, on the tongue and connected by a link or chain with the bar A, for rocking the latter on its axles for changing the height of cut or passing over obstructions. The lever is provided with the usual thumb lever $t$, and latch operating in connection with a rack $u'$ on the bracket $u$, for holding the bar A at any desired adjustment.

The concave L may be provided with one or more ribs $l$, for holding the stalks up from the flooring and adapting them to be more readily grasped by the fork or rake N'. The rake is made preferably with three or more curved teeth or tines, as shown, as giving a good and effective form thereto, but any suitable form of construction may be employed. The curved form of teeth, presenting the convex faces to the incoming stalks causes the latter to slide off freely into the concave and the teeth serve as an inner wall to the receptacle when the fork is at rest, in the intervals between its revolutions.

Having thus fully described my invention, what I claim is—

1. The combination in a corn harvester, of the finger bar, the flanged plates thereon, the divider boards secured to said flanged plates and the oppositely inclined, endless toothed chains crossing the planes of said dividing boards.

2. The combination of the divider boards, the upright shafts journaled in brackets on said boards, said brackets being provided with inclined stud shafts, and the inclined sprocket wheels on said stud shafts geared to and driven from the upright shafts, substantially as described.

3. The combination in a corn harvester of the inclined and toothed endless chains and actuating sprocket wheels, the divider boards underneath and fenders above said chains and the compressing and clearing rods operating in connection with said chains, substantially as described.

4. The side delivery fork or rake and the crank shaft for actuating it geared to and actuated from the upright shaft actuating one of the inclined and toothed endless gathering chains, substantially as described.

5. The combination with the grain receptacle, of the side delivery fork or rake having its stale pivoted as set forth, the actuating crank shaft therefor, the clutch for engaging said shaft with its acuating pinion, the cam for throwing said clutch out of and a lever for moving said clutch into engagement with said pinion, substantially as described.

6. The combination with the finger bar of the upright divider boards, fender boards secured thereto, the interposed inclined and toothed endless chains, the receptacle in rear of said finger bar and chains, and the intermittingly operating side delivery fork or rake operating in connection with said receptacle, substantially as and for the purpose specified.

In testimony whereof I have hereunto set my hand this 2d day of April, A. D. 1890.

AUGUSTUS E. ELLINWOOD.

Witnesses:
O. L. SADLER,
F. B. HARGETT.